United States Patent [19]

Kajitani et al.

[11] Patent Number: 4,945,685

[45] Date of Patent: Aug. 7, 1990

[54] HONING APPARATUS HAVING ELECTRICALLY OPERATED ACTUATOR FOR RELATIVE RECIPROCATING MOVEMENT BETWEEN HONING HEAD AND WORKPIECE

[75] Inventors: Yoshimi Kajitani, Toyota; Michiaki Ohta, Okazaki; Takao Miyatani, Toyota, all of Japan

[73] Assignee: Toyota Jidosha Kabushiki Kaisha, Toyota, Japan

[21] Appl. No.: 246,118

[22] Filed: Sep. 16, 1988

[30] Foreign Application Priority Data

Sep. 19, 1987 [JP] Japan .................. 62-235284

[51] Int. Cl.$^5$ ............................. B24B 49/00
[52] U.S. Cl. ................. 51/165.93; 51/165.91; 51/330; 51/34 R; 51/34 H; 51/331
[58] Field of Search ........... 51/32, 34 R, 34 H, 34 J, 51/165.78, 165.8, 165.83, 165.91, 165.93, 330, 331, 338–354

[56] References Cited

U.S. PATENT DOCUMENTS

| | | | |
|---|---|---|---|
| 4,505,074 | 3/1985 | Kogure | 51/165.93 |
| 4,823,061 | 4/1989 | Boolton et al. | 51/165.93 |

FOREIGN PATENT DOCUMENTS

| | | |
|---|---|---|
| 57-66854 | 4/1982 | Japan . |
| 59-93859 | 6/1984 | Japan . |
| 60-131160 | 7/1985 | Japan . |
| 62-173165 | 7/1987 | Japan . |
| 62-241656 | 10/1987 | Japan . |
| 62-277262 | 12/1987 | Japan . |

*Primary Examiner*—Frederick R. Schmidt
*Assistant Examiner*—M. Rachuba
*Attorney, Agent, or Firm*—Finnegan, Henderson, Farabow, Garrett and Dunner

[57] ABSTRACT

A honing apparatus for honing a cylindrical surface of a workpiece, including a honing head supporting honing stones, a first drive device having an electrically operated bidirectional actuator for effecting a relative reciprocating movement between the honing head and the workpiece in an axial direction of the cylindrical surface, a second drive device for effecting a relative rotating movement between the honing head and the workpiece, a diameter measuring device for measuring a diameter of the cylindrical surface of the workpiece, and a reciprocation control device connected to the diameter measuring device and the electrically operated actuator. The control device is adapted to operate based on a measurement of the diameter by the diameter measuring device, to determine at least one of a range of the relative reciprocating movement, and a speed distribution of the relative reciprocating movement over a range of the relative reciprocating movement. The control device controls the electrically operated bidirectional actuator based on the determined range and/or speed distribution of the relative reciprocating movement.

16 Claims, 6 Drawing Sheets

HONING APPARATUS HAVING ELECTRICALLY OPERATED ACTUATOR FOR RELATIVE RECIPROCATING MOVEMENT BETWEEN HONING HEAD AND WORKPIECE

BACKGROUND OF THE INVENTION

1. Field of the Invention

The present invention relates in general to a honing apparatus for honing internal or external cylindrical surfaces of a workpiece, and more particularly to a technique for improving the honing accuracy.

2. Discussion of the Prior Art

A honing apparatus or machine for finishing internal or external cylindrical surfaces of a workpiece to a relatively high degree of accuracy and smoothness generally includes (a) a honing head which supports abrasive honing stones or sticks such that the honing stones are opposed to the cylindrical surface of the workpiece and are movable substantially in a radial direction of the cylindrical surface, (b) a changing mechanism associated with the honing head, for changing either the radial position of the honing stones or the pressure of contact between the honing stones and the cylindrical surface, (c) a first drive device for effecting a relative reciprocating movement between the honing head and the workpiece, and (d) a second drive device for effecting a relative rotating movement between the honing head and the workpiece.

In the honing apparatus of the type indicated above, the honing stones are given by the first and second drive devices concurrent movements in both circumferential and axial directions of the cylindrical surface of the workpiece while the stones are held in contact with the cylindrical surface. At the same time, the honing stones are given by the changing mechanism a feed movement in the radial direction of the cylindrical surface, or a contact pressure against the cylindrical surface. It is recognized that the cylindricity, roundness, smoothness and other accuracy values of the honed surface are greatly influenced by the honing conditions such as the axial reciprocating range and speed of the honing stones relative to the workpiece, the rotating speed of the honing stones relative to the workpiece, and the radial feed rate of the stones or contact pressure of the stones against the workpiece surface. To hone the workpiece surface to sufficiently high degrees of accuracy and smoothness with high honing efficiency, the first and second drive devices and the changing mechanism should be accurately controlled with an excellent level of operating response.

Laid-open Publication No. 59-93859 of unexamined Japanese Utility Model Application discloses a honing apparatus which uses electrically operated motors as drive sources of the second drive device and the changing mechanism as indicated above. However, the publication is silent about the type of the drive source of the first drive device for reciprocating movement between the honing head and the workpiece. However, the known arrangements usually employ a hydraulically operated actuator as the drive source of the first drive device.

To improve the honing accuracy and honing efficiency, the first drive device should be precisely controlled to control the relative axial reciprocating movement of the honing stones in response to the actual conditions of the workpiece surface in the process of being honed. However, the hydraulically operated actuator conventionally used for the first drive device is difficult to control for regulating the range and speed of the relative reciprocating movement between the honing stones and the workpiece, with a short response to the varying conditions of the workpiece surface.

SUMMARY OF THE INVENTION

It is therefore an object of the present invention to provide a honing apparatus wherein the range and speed of relative reciprocating movement between the honing head and the workpiece may be accurately controlled according to the actual conditions of the honed surface.

The above object may be attained according to the principle of the present invention, which provides a honing apparatus for honing a cylindrical surface of a workpiece, comprising: a honing head supporting honing stones such that the honing stones are opposed to the cylindrical surface of the workpiece; a first drive device including an electrically operated bidirectional actuator for effecting a relative reciprocating movement between the honing head and the workpiece in an axial direction of the cylindrical surface; a second drive device for effecting a relative rotating movement between the honing head and the workpiece; a diameter measuring device for measuring a diameter of the cylindrical surface of the workpiece; and a reciprocation control device connected to the diameter measuring device and the electrically operated actuator, and operating based on a measurement of the diameter by the diameter measuring device, to determine at least one of a range of the relative reciprocating movement, and a speed distribution of the relative reciprocating movement over a range of the relative reciprocating movement. The reciprocation control device controls the electrically operated bidirectional actuator based on the determined range and/or speed distribution of the relative reciprocating movement.

In the honing apparatus of the present invention constructed as described above, the relative reciprocating movement between the honing head and the workpiece is given by the electrically operated bidirectional actuator of the first drive device. The diameter measuring device measures the diameter of the cylindrical surface of the workpiece, and supplies the reciprocation control device with the measured diameter of the cylindrical surface. Based on the measured diameter value of the cylindrical surface, the reciprocation control device determines at least one of the range of the relative reciprocating movement and the speed distribution of the reciprocating movement, and commands the electrically operated bidirectional actuator according to the determined movement range and/or speed distribution. More specifically, the operating range of the actuator is suitably changed if it is necessary to adjust the range of the axial reciprocating movement between the honing stones and the workpiece surface. If it is necessary to adjust the speed distribution of the reciprocating movement over its predetermined or controlled range, the operating speed of the actuator is suitably controlled.

Thus, the instant honing apparatus is adapted to automatically control the relative reciprocating movement of the honing stones and the workpiece, based on the currently measured diameter of the cylindrical surface of the workpiece, so that the accuracy and smoothness of the honed cylindrical surface are improved, with high honing efficiency or minimum honing time. More-over, the electrically operated bidirectional actuator of the first drive device assures accurate and quick changes of the relative reciprocating range and speed of the honing stones, which are not available by the conventionally used hydraulically operated actuator.

In one form of the present invention, the reciprocation control device controls the electrically operated actuator such that the range of the relative reciprocating movement is changed by an amount proportional to a difference between two values of the diameter of the cylindrical surface of the workpiece as measured at an axial end and an axially middle portion of the cylindrical surface.

In another form of the invention, the reciprocation control device controls the electrically operated actuator to control the speed distribution of the relative reciprocating movement such that a time duration during which the honing stones are kept in contact with an axial end portion of the cylindrical surface of the workpiece is changed by an amount proportional to a difference between two values of the diameter of the cylindrical surface as measured at an axial end and an axially middle portion of the cylindrical surface.

In a further form of the invention, the diameter measuring device is adapted to measure the diameter of the cylindrical surface of the workpiece while the honing head is moved in one direction from one axial end of the cylindrical surface toward the other axial end, and determines an amount of change of the above-indicated range and/or speed distribution of the relative reciprocating movement while the honing head is moved in a direction opposite to the above-indicated one direction.

In a still further form of the invention, the honing head comprises guides provided thereon so as to extend in the axial direction for guiding the honing head, and the diameter measuring device comprises an air micrometer device including at least one nozzle which is formed through one of the guides such that each nozzle is open toward the cylindrical surface of the workpiece. In this case, the diameter measuring device may further comprise: a pressure-voltage converter supported so as to rotate with the honing head and operable to convert a back pressure of the at least one nozzle of the air micrometer device into a voltage signal; a voltage-frequency converter supported so as to rotate with the honing head and connected to the pressure-voltage converter for converting the voltage signal into a frequency signal; a rotating coil supported so as to rotate with the honing head and connected to the voltage-frequency converter; and a stationary coil disposed stationary adjacent to the rotating coil and generating a voltage corresponding to an amount of change in a magnitude of a magnetic field produced by the rotating coil.

In a yet further form of the invention, the first drive device comprises: a spindle connected to the honing head; a spindle mover supported so as to move with the spindle in the axial direction, the spindle mover supporting the spindle such that the spindle and the spindle mover are rotatable relative to each other and immovable relative to each other in an axial direction of the spindle; a feedscrew disposed parallel to the spindle and immovably relative to the spindle in the axial direction, and rotated by the electrically operated bidirectional actuator; and a nut engaging the feedscrew and fixed to the spindle mover. In this case, the honing apparatus may further comprise: a changing mechanism associated with the honing head, for changing one of a radial position of the honing stones in a radial direction of the cylindrical surface of the workpiece, and a pressure of contact between the honing stones and the cylindrical surface; a rod axially movably received in an axial bore formed in the spindle; a rod mover supported so as to move with the rod in the axial direction, the rod mover supporting the rod such that the rod and the rod mover are rotatable relative to each other and immovable relative to each other in an axial direction of the rod; another feedscrew disposed parallel to the rod and supported by the spindle mover rotatably and immovably relative to the spindle mover in an axial direction of the above-indicated another feedscrew; another nut engaging the feedscrew and fixed to the rod mover; a non circular shaft extending coaxially from one end of the above-indicated another feedscrew and having a non-circular transverse cross sectional shape; and a rotating member supported immovably in an axial direction of the non-circular shaft and engaging the non-circular shaft rotatably with the non-circular shaft and movably relative to the non-circular shaft, the rotating member being rotated by an electrically operated bidirectional actuator of the changing mechanism.

In yet another form of the invention, the honing apparatus further comprise a changing mechanism associated with the honing head, for changing one of a radial position of the honing stones in a radial direction of the cylindrical surface of the workpiece, and a pressure of contact between the honing stones and the cylindrical surface, the changing mechanism including an electrically operated bidirectional actuator; a resistance measuring device for measuring a honing resistance between the honing stones and the cylindrical surface of the workpiece; and a honing control device connected to the resistance measuring device and the electrically operated bidirectional actuator of the changing mechanism. The honing control device operates based on the honing resistance measured by the resistance measuring device, to determine the radial position of the honing stones in the radial direction or the pressure of contact between the honing stones and the cylindrical surface of the workpiece. The honing control device is adapted to control the electrically operated bidirectional actuator of the changing mechanism based on the determined radial position or the pressure of contact.

In the above form of the invention, the changing mechanism is also driven by the electrically operated bidirectional actuator (which will be referred to as the second electrically operated actuator, as distinguished from the actuator of the first drive device). The resistance measuring device measures the honing resistance and supplies the honing control device with the measured honing resistance. Based on the measured honing resistance, the honing control device controls the second electrically operated actuator in order to adjust the radial position of the honing stones relative to the cylindrical surface of the workpiece, in the case where the stock removal of the workpiece is effected by a feed movement of the honing stones in the radial direction of the cylindrical surafce. In this case, the honing control device may be adapted to determine whether the honing resistance measured by the resistance measuring device is larger than a predetermined upper limit or smaller than a predetermined lower limit, and if the measured honing resistance is larger than the upper limit or smaller than the lower limit. The honing control device further determines a difference between the measured honing resistance and the upper or lower limit. The honing control device then controls the second electrically operated bidirectional actuator of the changing mechanism such that a rate of change in the radial position of the honing stones is changed by an amount proportional to the difference.

In the case where the stock removal of the workpiece is achieved by maintaining a predetermined pressure of contact between the honing stones and the workpiece surface, the honing control device controls the second electrically operated actuator to adjust the contact pressure based on the honing resistance measured by the resistance measuring device.

In either of the two cases described above, the radial feed rate of the honing head or stones or the contact pressure of the honing stones against the workpiece surface is automatically adjusted based on the actually measured honing resistance, so that otherwise possible loading or abnormal wear or breakage of the honing stones may be avoided, and the honing time may be further reduced.

BRIEF DESCRIPTION OF THE DRAWINGS

The above and other objects, features and advantages of the present invention will be better understood by reading the following detailed description of a presently preferred embodiment of the invention, when considered in conjunction with the accompanying drawings, in which.

DETAILED DESCRIPTION OF THE PREFERRED EMBODIMENT

Figures 1, 2:
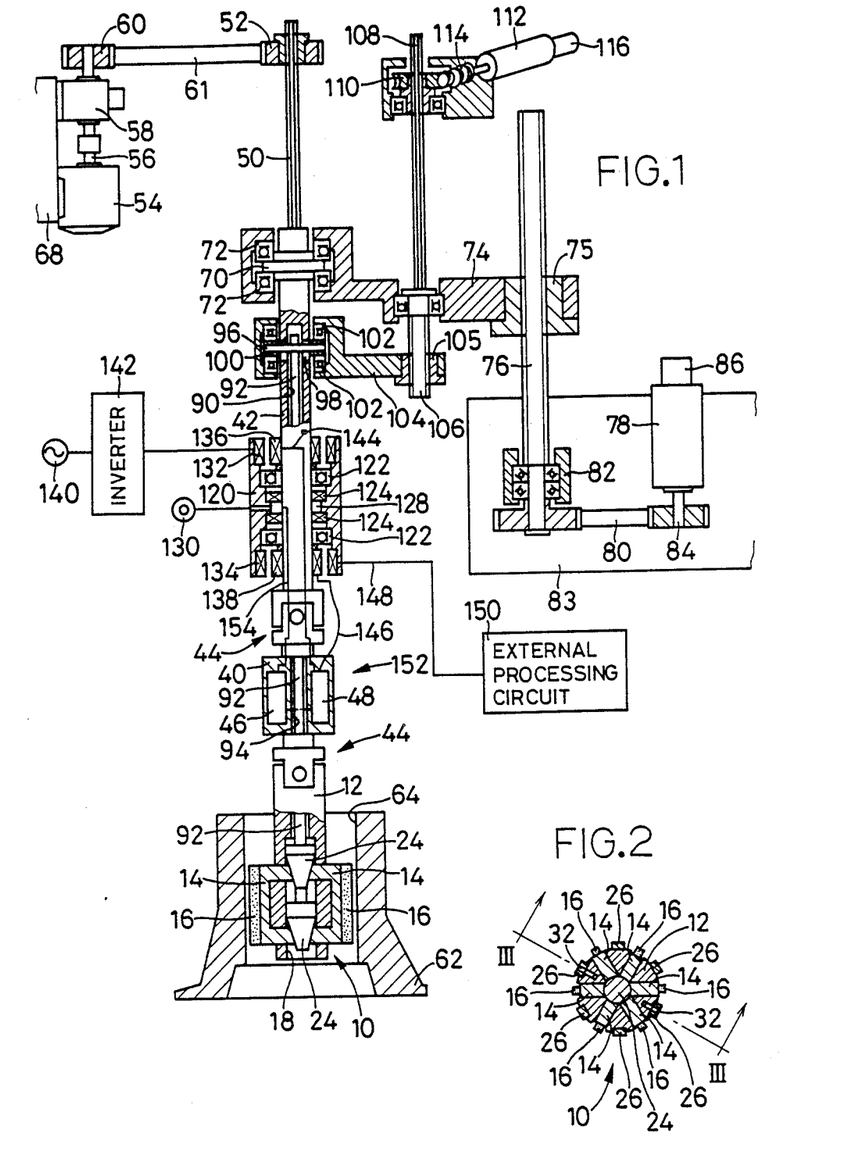
FIG. 1 is a schematic front elevational view in cross section of one embodiment of the present invention in the form of a single-spindle vertical honing machine for honing an internal cylindrical surface of a workpiece.
FIG. 2 is a transverse cross sectional view of a honing head of the honing machine of FIG. 1.

Referring first to FIG. 1, reference numeral 10 denotes a honing head which has a vertical posture with its axis (hereinafter referred to as "head axis") extending in the vertical direction. The honing head 10 includes a cylindrical tool body 12 extending in the head axis. As shown in the transverse cross sectional view of FIG. 2, the tool body 12 carries six generally U-shaped shoes 14 which extend from the head axis in the radial direction such that the shoes 14 are evenly spaced apart from each other in the circumferential direction of the tool body 12. These shoes 14 are slidably movable in the radial direction of the tool body 12. To the outer surfaces of the shoes 14, there are attached respective grinding stones (abrasive sticks) 16 as honing tools. The inner ends of the shoes 14 are positioned within a bore 18 formed through the tool body 12. The inner end faces of the shoes 14 are inclined, and these inclined inner end faces are held in engagement with complemental coned surfaces of two conical members 24, 24, which are received within the bore 18 slidably in the direction of the head axis. With the conical members 24 lowered in the bore 18, the shoes 14 are concurrently moved from the original position of FIG. 1 in the radially outward direction. The shoes 14 are moved toward the original position in the radially inward direction under a biasing action of a suitable spring (not shown) associated with the shoes 14 and the tool body 12, when the conical members 24 are lifted.

Figure 3:
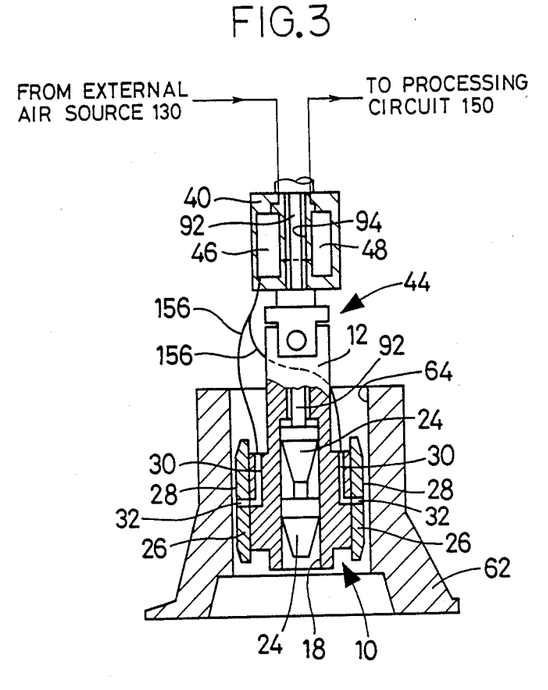
FIG. 3 is an elevational view in cross section take along line III—III of FIG. 2.

As shown in FIG. 2, the tool body 12 further has six cemented carbide metal guides 26 fixed thereon adjacent to the shoes 14 such that the guides 26 extend in the direction of the head axis. The guides 26 are evenly spaced apart from each other in the circumferential direction of the tool body 12. As is apparent from the cross sectional view of FIG. 3 taken along line III—III of FIG. 2, each guide 26 has an outer guide surface 28, which forms a part of a cylindrical surface whose axis is parallel to the head axis. Of the six guides 26, a pair of the guides which are opposed to each other diametrically of the tool body 12 have small-diameter air nozzles 32 formed therethrough in the radial direction, in fluid communication with respective air passages 30 formed in the tool body 12. The air nozzles 32 are open in the guide surfaces 28 of the above-indicated pair of guides 26. The two air nozzles 32 are aligned with each other in the direction of the head axis. The functions of the guides 26, air passages 30 and air nozzles 32 will be described later.

The tool body 12 is connected at its upper end to a first spindle 40 and a second spindle 42, via universal couplings 44, as shown in FIG. 1. The first spindle 40 accommodates a pressure-voltage converter 46, and a voltage-frequency converter 48. The functions of these converters 46, 48 will also be described later.

A spline shaft 50 extends coaxially from the upper end of the second spindle 42. On this spline shaft 50, there is axially slidably fitted a boss of a driven pulley 52, which is connected to a drive pulley 60 via a belt 61. The drive pulley 60 is connected to an output shaft 56 of a spindle motor 54 via a torque sensor 58. Namely, the first spindle 40, second spindle 42 and honing head 10 are rotated by the spindle motor 54. The torque sensor 58 detects a spindle torque about the axis of the honing head 10, which is almost proportional to a honing resistance between the honing stones 16 and a cylindrical surface of a cylinder bore 64 formed in a workpiece in the form of a cylinder block 62. The spindle motor 54 and the torque sensor 58 are secured to a frame 68 of the honing machine.

The second spindle 42 is formed with a radially outward flange 70 at its upper end portion. The flange 70 engages a spindle mover 74 via two thrust bearings 72. The spindle mover 74 supports the second spindle 42 such that the second spindle 42 is rotatable relative to the spindle mover 74 and is moved with the spindle mover 74. The spindle mover 74 has a nut 75 fixed thereto. The nut 75 engages a feedscrew in the form of a ballscrew 76 which is disposed parallel to the second spindle 42. With the ballscrew 76 rotated in opposite directions, the spindle mover 74 is reciprocated in the direction of the head axis. The ballscrew 76 is connected to an output shaft 84 of a first servomotor 78 via a belt 80. Described more specifically, an operation of the first servomotor 78 in one direction will cause the spindle mover 74 to be moved in the upward direction, whereby the first and second spindles 40, 42 and the honing head 10 are lifted by a distance equal to the distance of upward movement of the spindle mover 74. Similarly, an operation of the servomotor 78 in the opposite direction will cause the spindle mover 74 to be moved in the downward direction, whereby the honing head 10 is lowered by a distance equal to the distance of downward movement of the spindle mover 74. The ballscrew 76 is rotatably supported by a support member 82 such that the ballscrew 76 is immovable in its axial direction. The support member 82 and the first servomotor 78 are both secured to a frame 83 of the machine. The first servomotor 78 is provided with a first encoder 86 which generates a pulse signal representative of a rotating angle of the output shaft 84.

The second spindle 42 has an axial bore 90 formed therein so as to extend from an upper portion thereof a short distance below the flange 70, down to its lower end. In this axial bore 90, there is axially slidably inserted a rod 92, which extends from the lower end of the second spindle 42, through an axial bore 94 formed through the first spindle 40, into the bore 18 in the tool body 12. The rod 92 is connected at its lower end to the conical members 24 described above. It will be understood that this rod 92 is provided to move the honing stones 16 in the radially outward and inward directions. The universal coupling 44 described above has a central bore through which the rod 92 passes. Since the universal coupling 44 is adapted to be pivotable through a relatively small angle, the rod 92 does not disturb a flexible coupling movement of the universal coupling 44.

A pin 96 penetrates the upper end portions of the rod 92 and second spindle 42. The pin 96 engages the rod 92 such that these two members 96, 92 are rotated together and moved together in the axial direction of the rod 96. The second spindle 42 has a pair of elongate holes 98 formed in the axial direction. With the pin 96 extending through the elongate holes 98, the rod 92 and the pin 96 are movable over a limited distance in the axial direction of the rod 92. The opposite end portions of the pin 96 which extend outwardly from the outer circumferential surface of the second spindle 42 are held in engagement with a rod mover 104 through two thrust bearings 102, such that the rod 92 and the second spindle 42 are rotatable relative to the rod mover 104, and such that the rod 92 is moved in the axial direction with the rod mover 104.

The rod mover 104 has a nut 105 fixed thereto. The nut 105 engages a ballscrew 106 which is disposed parallel to the second spindle 42. The ballscrew 106 is supported rotatably by the spindle mover 74. A spline shaft 108 extends coaxially from the upper end of the ballscrew 106. The spline shaft 108 engages a boss of a worm wheel 110 such that the worm wheel 110 is slidable on the spline shaft 108. The worm wheel 110 engages a worm 114 which is connected to a second servomotor 112. That is, a rotary motion of the second servomotor 112 is transmitted to the spline shaft 108, via the worm 114 and the worm wheel 110 which serve as a speed reducer. Like the first servomotor 78 provided with the first encoder 86, the second servomotor 112 is provided with a second encoder 116.

In the above arrangement, an operation of the second servomotor 112 in one direction will cause the ballscrew 106 to be rotated in one direction to move the rod mover 104 away from the spindle mover 74, whereby the rod 92 is lowered relative to the tool body 12. As a result, the honing stones 16 are moved in the radially outward direction by an amount proportional to the distance of downward movement of the rod 92. Similarly, an operation of the second servomotor 112 in the opposite direction will cause the ballscrew 106 to be rotated in the opposite direction, whereby the rod 92 is lifted toward the spindle mover 74. Accordingly, the honing stones 16 are moved in the radially inward direction by an amount proportional to the distance of upward movement of the rod 92. Since the ballscrew 106 is supported by the spindle mover 74 such that the ballscrew 106 is rotatable relative to the spindle mover 74 and axially movable with the spindle mover 74, the relative axial position between the rod mover 104 and the spindle mover 74, and consequently the relative axial position of the rod 92 and the tool body 12 are kept unchanged, unless the ballscrew 106 is rotated.

A cylindrical member 120 is coaxially fitted via a pair of radial bearings 122 on a portion of the second spindle 42 below the rod mover 104. Between the radial bearings 122, there is formed an air chamber 128 whose fluid tightness is maintained by a pair of seals 124, which fluid-tightly engage the outer circumferential surface of the second spindle 42 and the inner circumferential surface of the cylindrical member 120. This air chamber 128 is connected to an external air pressure source 130. The functions of the air chamber 128 and pressure source 130 will be described later.

In upper and lower end portions of a bore formed through the cylindrical member 120, there are fixedly disposed two stationary coils 132, 134 in opposed relation with the outer circumferential surface of the second spindle 42. Within these stationary coils 132, 134, respective two rotating coils 136, 138 are mounted on the outer circumferential surface of the second spindle 42 such that there are left predetermined clearances between the opposed stationary and rotating coils 132, 136, and 134, 138. The upper stationary coil 132 is connected to an external power source 140 via an inverter 142, so that an AC voltage of a predetermined frequency is applied to the stationary coil 132. Accordingly, a voltage is produced by the corresponding rotating coil 136. This voltage is applied via a conductor 144 to the voltage-frequency converter 48 in the first spindle 40. On the other hand, the lower rotating coil 138 receives via a conductor 146 a frequency signal generated from the voltage-frequency converter 48. As a result, the corresponding stationary coil 134 generates a voltage signal corresponding to the received frequency signal. This voltage signal is applied to an external processing circuit 150 via a conductor 148.

There will next be described in detail the guides 26, air passages 30 and air nozzles 32 of the honing head 10, the pressure-voltage and voltage-frequency converters 46, 48 incorporated in the first spindle 40, the air chamber 128 in the second spindle 42, the external air pressure source 130, and the processing circuit 150. These members constitute an automatic sizing device 150 of an air micrometer type for measuring the inner diameter of the cylinder block 62. A stream of high-pressure air delivered from the air pressure source 130 is supplied to the air nozzles 32 through the air chamber 128, air passage 154, pressure-voltage converter 46, air passages 156 (shown in FIG. 3), and air passage 30, and is spouted from the air nozzles 32 against the surface of the cylinder bore 64 of the cylinder block 62, at right angles to the surface. The back pressure of the air nozzles 32 has a certain relationship with a gap between the open end of the air nozzles 32 and the surface of the cylinder bore 64. This back pressure is converted into a corresponding voltage signal by the pressure-voltage converter 46, and the voltage signal is converted by the voltage-frequency converter 48 into a corresponding frequency signal. The frequency signal is fed to the processing circuit 150 via the rotating and stationary coils 138, 134. The frequency signal is then converted by the processing circuit 150 into a corresponding pulse signal corresponding to the frequency represented by the frequency signal.

Figure 4:
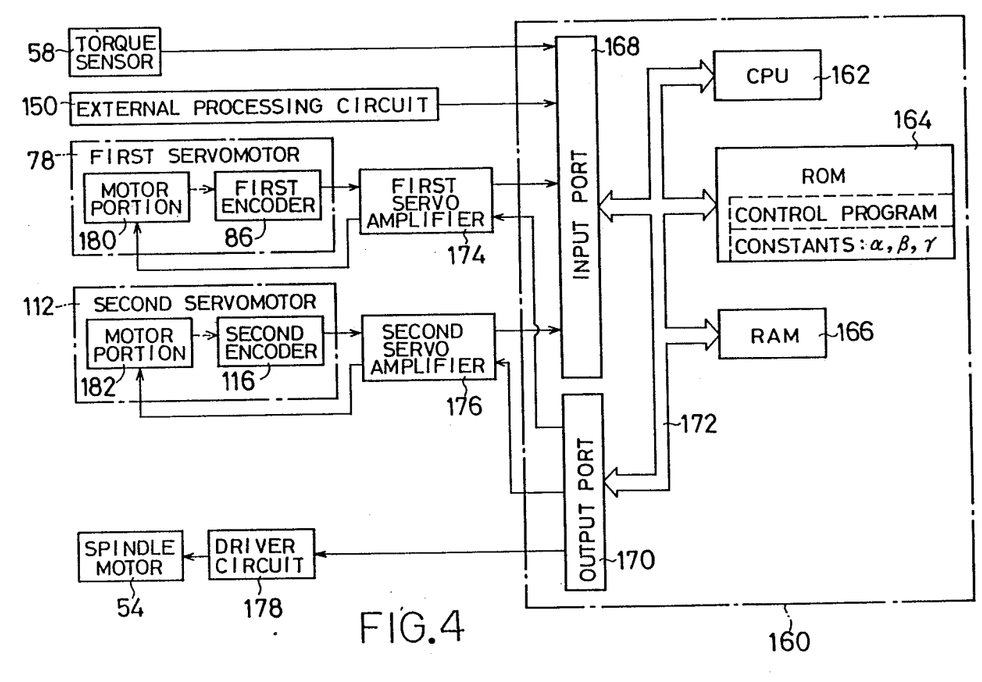
FIG. 4 is a block diagram showing an electric control system of the honing machine.

By reference to FIG. 4, a honing control circuit 160 of the instant honing machine will next be described in detail. This control circuit 160, whose major portion is constituted by a computer, includes a central processing unit (CPU) 162, a read-only memory (ROM) 164, a random-access memory (RAM) 166, an input port 168, an output port 170, and a bus 172. To the input port 168, there are connected the torque sensor 58 and the processing circuit 150 of the automatic sizing device 152. Also, the encoders 86, 116 of the first and second servomotors 78, 112 are connected to the input port 168 via a first and a second servo amplifier 174, 176, respectively. On the other hand, the output port 170 are connected to motor portions 180, 182 of the servomotors 78, 112, via the respective first and second servo amplifiers 174, 176. The first and second servo amplifiers 174, 176 receive command signals from the output port 170 and feedback signals from the first and second encoders 86, 116. The feedback signals represent rotating angles of the output shafts of the first and second servomotors 78, 112. The servo amplifiers 174, 176 calculate differences between the command and feedback signals, and command the motor portions 180, 182 of the servomotors 78, 112 so that the differences are zeroed.

A honing operation on the instant honing machine is effected according to a control program stored in the ROM 164 of the honing control circuit 160. Initially, the honing head 10 is introduced into the cylinder bore 64 of the cylinder block 62, and data representative of determined various honing conditions such as the amount of stock removal is entered into the RAM 166. Upon activation of a start switch of the machine, the spindle motor 54, and the first and second servomotors 78, 122 are operated under the determined conditions. The honing head 10 is rotated while it is reciprocated over a controlled range in the axial direction. Examples of controlled reciprocation patterns of the honing head 10 within the cylinder bore 64 are illustrated in FIGS. 5, 7 and 9.

If there exist intolerable amounts of errors in diameter, roundness and cylindricity of the cylindrical bore 64 after a pre-honing machining operation or during a honing process, the errors should be reduced to within predetermined tolerances, by controlling the range and rate of axial reciprocation of the honing stones 16, and a honing rate at which the honing stones 16 are radially fed against the surface of the cylinder bore 64 in the radially outward direction.

Figure 5:
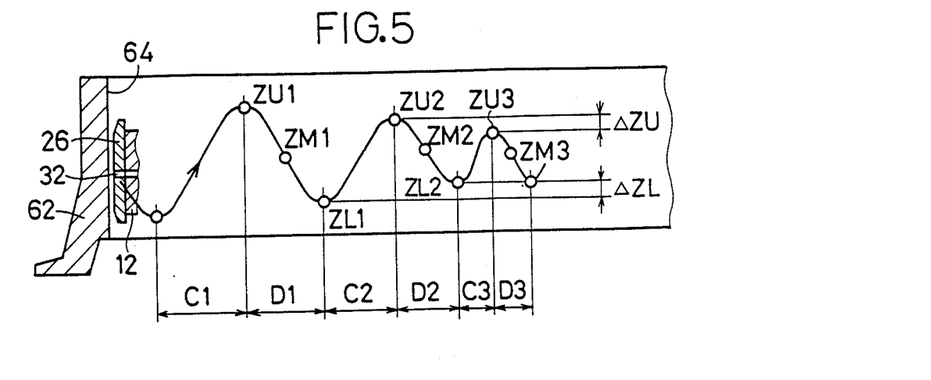
FIG. 5 and FIG. 7 are views illustrating an operation to control the range of reciprocating movement of the honing head of the honing machine.
Figure 6:
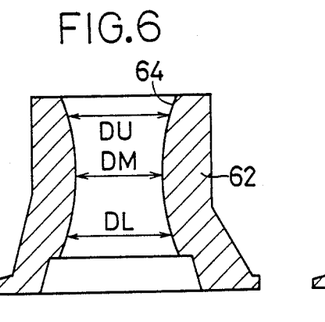
FIG. 6 and FIG. 8 are front elevational views in cross section of the internal, cylindrical surface of the workpiece, corresponding to the operations of FIGS. 5 and 7, respectively.
Figure 7:
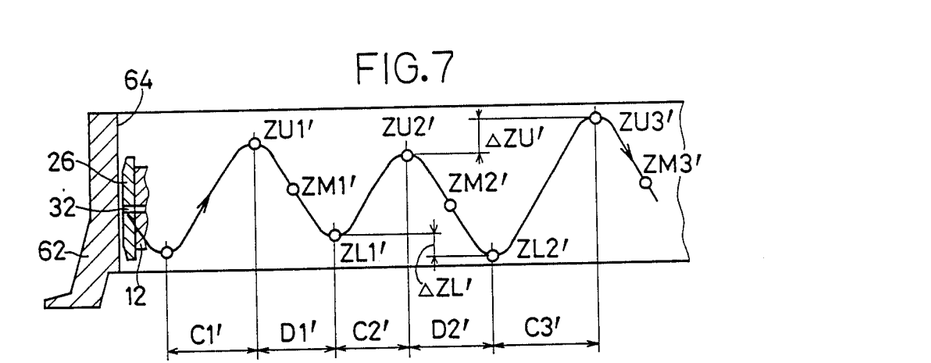
Figure 8:
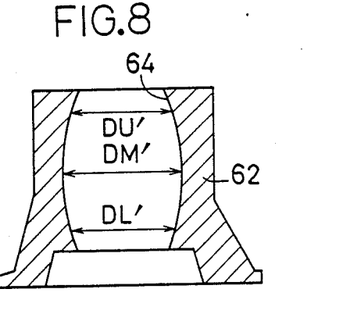
Figure 9:
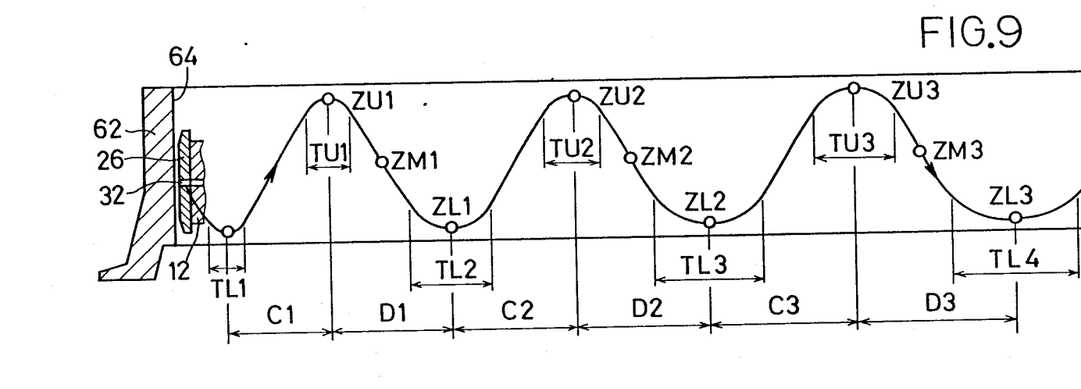
FIG. 9 is a view illustrating an operation to control the speed of reciprocation of the honing head.

The examples shown in FIGS. 5-9 relate to honing operations on the cylinder bore 64 which has a poor degree of cylindricity. The paths shown in FIGS. 5, 7 and 9 are taken by the open end of the air nozzles 32 during reciprocation of the honing head 10. In these figures, character C represents an UP time during which the honing stones 16 are lifted from a lower stroke end ZL up to an upper stroke end ZU, while character D represents a DOWN time during which the stones 16 are lowered from the upper stroke end ZU down to the lower stroke end ZL. For the sake of explanation, a sum of the UP and DOWN times C and D is referred to as one honing cycle.

While the honing stones 16 are in a lowering stroke (corresponding to the DOWN time D), the diameter of the cylinder bore 64 is measured at the upper stroke end ZU, lower stroke end ZL, and an intermediate position ZM between the stroke ends ZU and ZL. While the stones 16 are in a lift stroke (corresponding to the UP time C), the CPU 162 calculates, based on the measured diameter values, an amount of change $\Delta ZU$ of the upper stroke end ZU and an amount of change $\Delta ZL$ of the lower stroke end ZL, in order to change the range of reciprocation of the honing stones 16 (honing head 10), according to the following equations (1) and (2):

$$\Delta ZU = \alpha(DM - DU), \quad (1)$$

$$\Delta ZL = \alpha(DL - DM), \quad (2)$$

where,
DU: Cylinder bore diameter measured at ZU
DM: Cylinder bore diameter measured at ZM
DL: Cylinder bore diameter measured at ZL
$\alpha$: Predetermined constant Described more specifically by referring first to the example of FIG. 6 wherein the diameter of the cylinder bore 64 measured at the intermediate position ZM is smaller than those measured at the upper and lower stroke ends ZU, ZL of the head 10, the amounts of change $\Delta ZU$ and $\Delta ZL$ are first calculated based on the diameter values measured at ZU1, ZM1 and ZL1 in a given honing cycle, as indicated in FIG. 5. Then, the lower stroke end ZL2 of the next honing cycle is determined such that the lower stroke end ZL2 is located above the preceding lower stroke end ZL1 by the calculated amount $\Delta ZL$. Further, the upper stroke end ZU3 of the third honing cycle is determined such that the end ZU3 is located below the preceding upper stroke end ZU2 of the second honing cycle by the calculated amount $\Delta ZU$. As a result, the range of upward or lifting movement of the honing stones 16 is narrowed and limited to the relatively intermediate portion of the cylinder bore 64, as indicated in FIG. 5, so that the honing stones 16 hone primarily the intermediate portion of the bore 64.

In the case where the diameter of the cylinder bore 64 measured at the intermediate position DM' is larger than those measured at the upper and lower stroke ends DU', DL' as indicated in FIG. 8, the amounts of change $\Delta ZU'$ and $\Delta ZL'$ are first calculated based on the diameter values measured at ZU1', ZM1' and ZL1' in a given honing cycle, as indicated in FIG. 7, in the same manner in which the amounts of change $\Delta ZU$ and $\Delta ZL$ are calculated. Then, the lower stroke end ZL2' of the next honing cycle is determined such that the lower stroke end ZL2' is located below the preceding lower stroke end ZL1' by the calculated amount $\Delta ZL'$. Further, the upper stroke end ZU3' of the third honing cycle is determined such that the end ZU3' is located above the preceding upper stroke end ZU2' of the second honing cycle by the calculated amount ΔZU'. As a result, the range of upward or lifting movement of the honing stones 16 is broadened, as indicated in FIG. 7. Consequently, the upper and lower end portions of the cylinder bore 64 are honed for an increased length of time.

In a honing operation, it is required that a pressure of contact between the honing stones 16 and the surface of the cylinder bore 64 be constant over the entire length of the cylinder bore 64. Namely, the contact pressure at the open ends of the bore 64 should be almost equal to that at the axially middle point of the bore 64, in order to assure almost equal amounts of stock removal at the open ends and middle point of the bore 64. To this end, it is desirable that the honing stones 16 move beyond the open ends of the cylinder bore 64 by a suitable distance, at the turning points of the reciprocating movements. In other words, it is desirable that the honing stroke of the honing stones 16 be greater than the axial length of the cylinder bore 64 by a suitable overrun distance. However, there may be some geometrical or configurational restrictions that prevent a sufficient amount of such overrun distance of the honing stones 16. For instance, no overrun distance of the stones 16 can be provided at the end of the cylinder bore 64 which is closed. In this case, the diameter of the closed end of the bore 64 tends to be smaller than that at the intermediate portion of the bore 64. In view of the above, the honing times for the end portions of the cylinder bore 64 per unit length of the bore are increased as compared with that for the intermediate portion of the bore 64, by automatically adjusting the reciprocating speed of the honing head 10, depending upon the axial positions of the bore 64, as described below.

Referring to FIG. 9, there will be described in detail the above aspect of the invention wherein the reciprocating speed or rate of the honing head 10 is automatically controlled. Based on the diameter values of the cylinder bore 64 as measured at the upper and lower stroke ends ZU, ZM and the intermediate portion ZM of the bore 64, amounts of change ΔTU, ΔTL of honing times TU, TL for honing the upper and lower end portions of the bore 64 by the stones 16 are calculated according to the following equations (3) and (4):

$$\Delta TU = \beta(DM - DU), \quad (3)$$

$$\Delta TL = \beta(DL - DM), \quad (4)$$

where, $\beta$: Predetermined constant

If the honing times TU and TL for honing the upper and lower end portions of the bore 64 are determined as indicated above, the end portions of the bore are honed for longer times per unit length of the bore, than the intermediate portion of the bore. That is, even if the honing stones 16 cannot have a sufficient overrun distance beyond the upper and lower ends of the cylinder bore 64, the end portions of the bore can be honed by the same amount as that when a sufficient overrun distance was provided.

Described in more detail in connection with the example of FIG. 9 wherein the honing stones 16 are held in contact with the upper end portion of the bore 64 for a time duration of TU1 in a given honing cycle, the amount of change ΔTU1 is calculated based on the diameter values of the bore 64 measured in the same honing cycle at the upper stroke end ZU1 of the stones 16 and at the intermediate portion ZM1 of the bore 64. Then, a honing time TU3 in the third honing cycle is determined such that the time TU3 is longer by the calculated amount of change ΔTU1 than a honing time TU2 in the second honing cycle. Similarly, a honing time TL for honing the lower end portion of the bore 64 (at and near the lower stroke end ZL) is determined in the same manner. Thus, the speed distribution of the reciprocating movement of the honing stones 16 (honing head 10) is automatically controlled such that the time duration for which the honing stones 16 are kept in contact with the end portions of the cylinder bore 64 is changed by an amount proportional to the difference between the diameter values of the bore 64 as measured at the stroke end of the stones 16 and at the axially middle portion of the bore 64.

Figure 10:
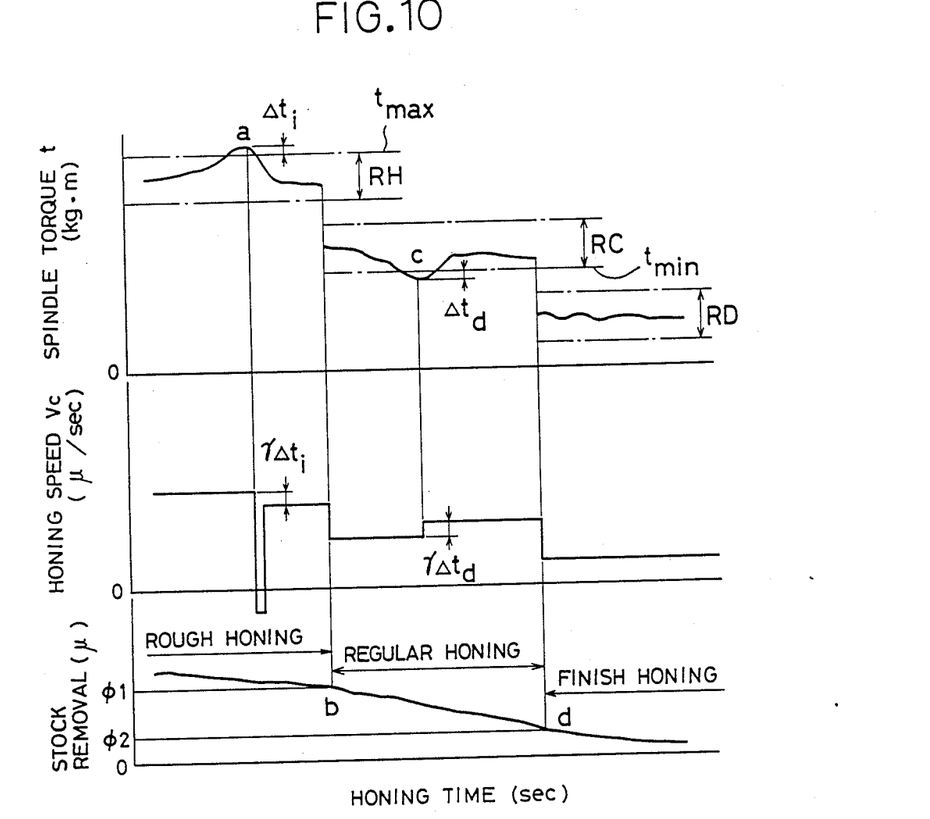
FIG. 10 is a graph illustrating a honing speed controlled in the instant embodiment, in relation to the spindle torque and an amount of stock removal from the workpiece.
Figure 11:
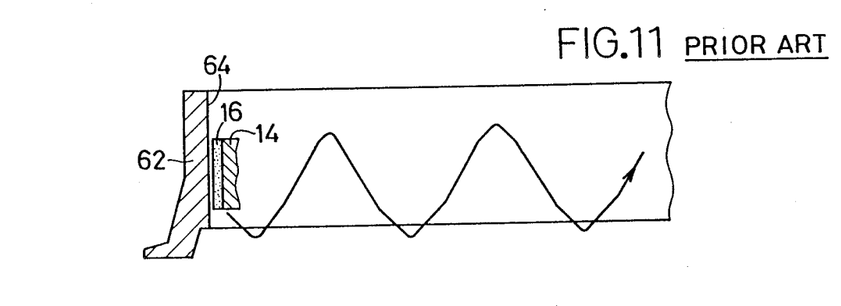
FIG. 11 is a view illustrating a reciprocating movement of a honing head of a known internal honing machine, which is effected by a hydraulically operated actuator.

Referring to FIG. 10, there will be described a manner in which the honing speed Vc (i.e., a rate at which the honing stones 16 are fed against the surface of the cylinder bore 64) is controlled. In the instant embodiment, a honing operation on the cylinder bore 64 is effected in three steps. Namely, a honing operation consists of a rough honing step, a regular honing step and a finish honing step. These honing steps are conducted at predetermined different honing speeds Vc. If the surface smoothness of the bore 64 is extremely low, however, the honing resistance between the stones 16 and the bore surface 64 in the rough honing step may be outside a predetermined optimum range. In the instant example, a spindle torque "t" which relates to the honing resistance is monitored. If the monitored spindle torque "t" becomes outside a predetermined range, the CPU 162 determines that the honing resistance becomes outside the optimum range, and adjusts the honing speed Vc. More specifically, if the spindle torque "t" exceeds an upper limit $t_{max}$ of the optimum range or becomes smaller than a lower limit $t_{min}$ of the optimum range, the CPU 162 calculates a difference $\Delta t_i$ between the values "t" and $t_{max}$, or a difference $\Delta t_d$ between the values "t" and $t_{min}$, and updates the honing speed Vc based on the calculated difference $\Delta t_i$ or $\Delta t_d$, according to the following equations (5) and (6):

$$Vc' = Vc - \gamma \Delta t_i, \quad (5)$$

$$Vc' = Vc + \gamma \Delta t_d, \quad (6)$$

where, $\gamma$: Predetermined constant

There will be described in detail the manner of updating the honing speed Vc (the rate at which the radial position of the honing stones 16 is changed). For example, the monitored spindle torque "t" may exceed the upper limit of a predetermined optimun range RH indicated at "a" in FIG. 10 (top graph), if the stock removal rate of the honing stones 16 is excessive in the rough honing step due to poor positioning of the cylinder block 62 or excessive amount of stock removal, or if the honing stones 16 are about to be or have been loaded or glazed. In this case, the second servomotor 112 is activated to move the honing stones 16 in the radially inward direction away from the surface of the cylinder bore 64. After the positioning error of the cylinder block 62 is corrected or after the loaded surfaces of the stones 16 are dressed, the rough honing operation is resumed, with a honing speed Vc (rate of movement of the stones 16 in the radially outward direction) which is lower than the last used value, by an amount of change $\gamma \Delta t_i$ calculated according to the equation (5) indicated above. See the middle graph of FIG. 10. Then, the regular honing step is initiated when the amount of stock removal reaches a predetermined value $\phi_1$, as indicated at "b" in FIG. 10 (bottom graph).

On the other hand, if the stock removal rate of the honing stones 16 in the regular honing step is excessively low, the spindle torque "t" becomes lower than the lower limit of a predetermined optimum range RC, as indicated at "c" in FIG. 10 (top graph). If the same honing speed Vc is maintained, the self-dressing function of the honing stones 16 is reduced, and the stones 16 tend to be loaded, whereby the honing time is unnecessarily increased. To avoid this, the honing speed Vc is increased by the calculated amount $\gamma \Delta t_d$, to accordingly increase the stock removal rate. When the amount of stock removal reaches a predetermined value $\phi_2$ indicated at "d" in FIG. 10 (bottom graph), the regular honing step is followed by the finish honing step.

It will be noted that the speed or rate of reciprocating movement of the honing stones 16 can be readily controlled by regulating the operating speed of the electrically operated first servomotor 78. This is not possible in the known arrangement wherein the honing head is reciprocated by a hydraulically operated actuator. In the known arrangement, the speed at which the honing head is reciprocated near the turning points (stoke ends) is limited, that is, cannot be readily controlled. In the known arrangement, deceleration valves or other hydraulic components are generally required to lower the rate of movements of the honing stones near the ends of the cylinder bore to be honed, if the overrun distances of the stones beyond the ends of the bore are not sufficient. However, the hydraulically operated actuator is not capable of accurately controlling the reciprocating movement of the honing head, depending upon the difference between the diameter values measured at the end and intermediate portions of the bore, as indicated in FIG. 9. To the contrary, the instant arrangement wherein the honing head 10 is driven by the electrically operated actuator 78 is highly capable of controlling the speed distribution of the reciprocating movement of the head 10 (stones 16), depending upon the differences of the diameter values measured at the end and intermediate portions of the cylinder bore 64. Further, the electrically operated actuator 78 has a comparatively high degree of operating response to a change in the diametrical difference of the bore.

It follows from the foregoing description that the conical members 24, rod 92, rod mover 104, ballscrew 106, and second servomotor 112 constitute a major portion of a changing mechanism for changing the radial position of the honing stones 16, i.e., for changing the honing speed Vc or the rate of radial movement of the stones 16 against the surface of the cylinder bore 64. The second servomotor 112 serves as a drive source of the changing mechanism. It will also be understood that the first and second spindles 40, 42, spindle mover 74, ballscrew 76 and first servomotor 78 constitute a major portion of a first drive device for effecting a relative reciprocating movement between the honing head 10 and the workpiece 62. The first servomotor 78 serves as a drive source of the first drive device. Further, the first and second spindles 40, 42 and spindle motor 54 constitute a second drive device for effecting a relative rotating movement between the honing head 10 and the workpiece 62. It will also be understood that the automatic sizing device 152 serves as a diameter measuring device for measuring the diameter of the cylinder bore 64 being honed, while the torque sensor 58 serves as a resistance measuring device for measuring the honing resistance between the honing stones 16 and the cylindrical surface of the workpiece 62. It is further understood that the honing control circuit 160 and the first servo amplifier 174 constitute a reciprocation control device for controlling the first servomotor 78 to determine the range of the reciprocating movement of the honing head 10 relative to the workpiece 62, and the speed distribution of the reciprocating movement of the honing head 10 (honing stones 16) over the range of the reciprocating movement. The control circuit 160 and the second servo amplifier 176 constitute a honing control device for controlling the second servomotor 112 to determine the radial position of the honing head 10 in the radial direction, i.e., honing speed Vc at which the honing stones 16 are fed against the surface of the cylinder bore 64 in the radially outward direction.

While the present invention has been described in its presently preferred embodiment, the invention may be otherwise embodied.

In the illustrated embodiment, the honing stones 16 are radially fed at a controlled rate against the surface of the cylinder bore 64 by the movement of the rod 92 driven by the second servomotor 112. However, the honing stones 16 may be radially fed under a biasing action of suitable biasing means such as a spring member disposed between the stones 16 and the rod 92, or a pressurized oil or air. In this case, the pressure of contact between the stones 16 and the surface of the bore 64 is suitably controlled, based on a difference between the actually measured honing resistance and the predetermined upper or lower limit.

Further, the combination of the shoes 14 and the conical members 24 to radially move the stones 16 may be replaced by a suitable rack-and-pinion mechanism wherein the pinion is driven by the second servomotor 112.

Although the diameter of the cylinder bore 64 is measured at three positions, i.e., at the upper and lower strokes ends ZU, ZL of the stones 16 and at an intermediate position ZM of the bore 64, it is possible to measure the diameter at four or more positions along the axis of the bore 64. In this instance, the reciprocating speed of the stones 16 may be varied at four or more axial positions of the bore 64, based on the measured four or more diameter values.

In the illustrated embodiment, the honing head 10 is axially moved and rotated relative to the workpiece in the form of the cylinder block 62, the workpiece may be moved and rotated relative to the honing head 10 which is held stationary.

While the illustrated embodiment is adapted to hone the internal cylindrical surface 64 of the workpiece 62, the principle of the present invention may be equally practiced for honing an external cylindrical surface of a workpiece.

It will be understood that the invention may be embodied with various other changes, modifications and improvements, which may occur to those skilled in the art, without departing from the spirit and scope of the invention defined in the following claims.

What is claimed is:

1. A honing apparatus for honing a cylindrical surface of a workpiece comprising:

a honing head supporting honing stones such that said honing stones are opposed to said cylindrical surface of the workpiece;

a first drive device including an electrically operated bidirectional actuator for effecting a relative reciprocating movement betweens said honing head and said workpiece in an axial direction of said cylindrical surface;

a second drive device for effecting a relative rotating movement between said honing head and said workpiece;

a diameter measuring device for measuring a plurality of diameter values at respective axial positions of said cylindrical surafce of the workpiece; and a reciprocation control device connected to said diameter measuring device and said electrically operated bi-directional actuator, and governed by the plurality of measured diameter values for determining either first values corresponding to a range of said relative reciprocating movement, second values corresponding to a speed distribution of said relative reciprocating movement over a range of the relative reciprocating movement, or for determining both said first and second values, said reciprocating control device controlling said electrically operated bidirectional actuator based on the determined corresponding values.

2. A honing apparatus according to claim 1, wherein said reciprocation control device controls said electrically operated actuator such that said range of the relative reciprocating movement is changed by an amount proportional to a difference between two values of said diameter of said cylindrical surface of the workpiece as measured at an axial end and an axially middle portion of said cylindrical surface.

3. A honing apparatus according to claim 1, wherein said reciprocation control device controls said electrically operated actuator to control said speed distribution of said relative reciprocating movement such that a time duration during which said honing stones are kept in contact with an axial end portion of said cylindrical surface of the workpiece is changed by an amount proportional to a difference between two values of said diameter of said cylindrical surface as measured at an axial end and an axially middle portion of said cylindrical surface.

4. A honing apparatus according to claim 1, wherein said diameter measuring device measures the diameter of said cylindrical surface of the workpiece while said honing head is moved in one direction from one axial end of said cylindrical surface toward the other axial end, and determines an amount of change of said at least one of said range and speed distribution of said relative reciprocating movement while said honing head is moved in a direction opposite to said one direction.

5. A honing apparatus according to claim 1, wherein said honing head comprises guides provided thereon so as to extend in said axial direction for guiding the honing head, and said diameter measuring device comprises an air micrometer including at least one nozzle which is formed through one of said guides such that said at least one nozzle is open toward said cylindrical surface of the workpiece.

6. A honing apparatus according to claim 5, wherein said diameter measuring device further comprises:

a pressure-voltage converter supported so as to rotate with said honing head and operable to convert a back pressure of said at least one nozzle of said air micrometer into a voltage signal;

a voltage-frequency converter supported so as to rotate with said honing head and connected to said pressure-voltage converter for converting said voltage signal into a frequency signal;

a rotating coil supported so as to rotate with said honing head and connected to said voltage-frequency converter; and a stationary coil disposed stationary adjacent to said rotating coil and generating a voltage corresponding to an amount of change in a magnitude of a magnetic field produced by said rotating coil.

7. A honing apparatus according to claim 1, wherein said first drive device comprises:

a spindle connected to said honing head;

a spindle mover supported so as to move with said spindle in said axial direction, said spindle mover supporting said spindle such that said spindle and said spindle mover are rotatable relative to each other and immovable relative to each other in an axial direction of said spindle;

a feedscrew disposed parallel to said spindle and immovably relative to said spindle in said axial direction, and rotated by said electrically operated bidirectional actuator; and a nut engaging said feedscrew and fixed to said spindle mover.

8. A honing apparatus according to claim 7, further comprising a changing mechanism associated with said honing head, for changing one of a radial position of said honing stones in a radial direction of said cylindrical surface of the workpiece, and a contact pressure between said honing stones and said cylindrical surface, said changing mechanism including:

a rod associated with said honing stones and axially movably received in an axial bore formed in said spindle;

a rod mover supported so as to move with said rod in said axial direction, said rod mover supporting said rod such that said rod and said rod mover are rotatable relative to each other and immovable relative to each other in an axial direction of said rod;

another feedscrew disposed parallel to said rod and supported by said spindle mover in an axial direction of said another feedscrew;

another nut engaging said feedscrew and fixed to said rod mover;

a non-circular shaft extending coaxially from one end of said another feedscrew and having a non-circular transverse cross sectional shape;

a rotating member supported immovably in a axial direction of said non-circular shaft and engaging said non-circular shaft rotatably with said non-circular shaft and movably relative to said non-circular shaft; and another electrically operated bidirectional actuator for rotating said rotating member.

9. A honing apparatus according to claim 1, further comprising:

a changing mechanism associated with said honing head, for changing one of a radial position of said honing stones in a radial direction of said cylindrical surface of the workpiece, and a pressure of contact between said honing stones and said cylindrical surface, said changing mechanism including an electrically operated bidirectional actuator;

a resistance measuring device for measuring a honing resistance between said honing stones and said cylindrical surface of the workpiece; and a honing control device connected to said resistance measuring device and said electrically operated bidirectional actuator of said changing mechanism, and operating based on the honing resistance measured by said resistance measuring device, to determine said one of the radial position of said honing stones in said radial direction and said pressure of contact between said honing stones and said cylindrical surface of the workpiece, said honing control device controlling said electrically operated bidirectional actuator of said changing mechanism based on the determined one of the radial position and the pressure of contact.

10. A honing apparatus according to claim 9, wherein said honing control device determines whether the honing resistance measured by said resistance measuring device is larger than a predetermined upper limit or smaller than a predetermined lower limit, and if the measured honing resistance is larger than said upper limit or smaller than said lower limit, determines a difference between said measured honing resistance and said upper or lower limit, said honing control device controlling said electrically operated bidirectional actuator of said changing mechanism such that a rate of change in the radial position of said honing stones is changed by an amount proportional to said difference.

11. A honing apparatus for honing a cylindrical surface of a workpiece, comprising:
a honing head supporting honing stones such that said honing stones are opposed to said cylindrical surface of the workpiece;
a first drive device for effecting a relative reciprocating movement between said honing head and said workpiece in an axial direction of said cylindrical surface;
a second drive device for effecting a relative rotating movement between said honing head and said workpiece;
a changing mechanism associated with said honing head, for changing one of a radial position of said honing stones in a radial direction of said cylindrical surface of the workpiece, and a contact pressure between said honing stones and said cylindrical surface, said changing mechanism including an electrically operated bidirectional actuator;
a resistance measuring device for measuring a resistance to said relative rotating movement between said honing stones and said cylindrical surafce of the workpiece; and
a honing control device connected to said resistance measuring device and said electrically operated bidirectional actuator of said changing mechanism, governed by the honing resistance measured by said resistance measuring device, for determining said one of the radial position of said honing stones in said radial direction and said contact pressure between said honing stones and said cylindrical surface of the workpiece, said honing control device controlling said electrically operated bidirectional actuator of said changing mechanism based on the determined one of the radial position and the contact pressure.

12. A honing apparatus for honing a cylindrical surface of a workpiece, comprising:
a honing head supporting honing stones such that said honing stones are opposed to said cylindrical surface of the workpiece, said honing head including gu ides provided thereon so as to extend in an axial direction of said cylindrical surface for guiding the honing head;
at least one of said guides having an air nozzle formed therethrough;
a first drive device for effecting a relative reciprocating movement between said honing head and said workpiece in said axial direction of said cylindrical surface;
a second drive device for effecting a relative rotating movement between said honing head and said workpiece; and
a diameter measuring device for measuring a diameter of said cylindrical surface of the workpiece, said diameter measuring device comprising an air micrometer which includes said air nozzle formed in each of said at least one of said guides of said honing head.

13. A honing apparatus for honing a cylindrical surface of a workpiece, comprising:
a honing head supporting honing stones such that said honing stones are opposed to said cylindrical surafce of the workpiece said honing head including a plurality of guides thereon extending in an axial direction for guiding the honing head;
a first drive device including an electrically operated bidirectional actuator for effecting a relative reciprocating movement between said honing head and said workpiece in an axial direction of said cylindrical surface;
a second drive device for effecting a relative rotating movement between said honing head and said workpiece;
a diameter measuring device including at least one nozzle formed through one of said plurality of guides, said at least one nozzle being open toward said cylindrical surface of the workpiece for measuring a diameter of said cylindrical surface of the workpiece; and
a reciprocation control device connected to said diameter measuring device and said electrically operated actuator governed by a measured diameter for determining either first values corresponding to a range of said relative reciprocating movement, second values corresponding to a speed distribution of said relative reciprocating movement over a range of the relative reciprocating movement, or both said first and second values said reciprocation control device controlling said electrically operated bidirectional actuator based on the determined values.

14. A honing apparatus according to claim 13, wherein said diameter measuring device further comprises:
a pressure-voltage converter supported so as to rotate with said honing head and operable to convert a back pressure of said at least one nozzle into a voltage signal;
a voltage-frequency converter supported so as to rotate with said honing head and connected to said pressure-voltage converter for converting said voltage signal into a frequency signal;
a rotating coil supported so as to rotate with said honing head and connected to said voltage-frequency converter; and
a stationary coil disposed stationarily adjacent said rotating coil for generating a voltage corresponding to an amount of change in a magnitude of a magnetic field produced by said rotating coil.

15. A honing apparatus for honing a cylindrical surface of a workpiece, comprising:

a honing head supporting honing stones such that said honing stones are opposed to said cylindrical surface of the workpiece;

a first drive device including a first electrically operated bidirectional actuator for effecting a relative reciprocating movement between said honing head and said workpiece in an axial direction of said cylindrical surface;

a second drive device for effecting a relative rotating movement between said honing head and said workpiece;

a diameter measuring device for measuring a diameter of said cylindrical surface of the workpiece; and a reciprocation control device connected to said diameter measuring device and said first electrically operated actuator, governed by a measure diameter for determining either first values corresponding to a range of said relative reciprocating movement, second values corresponding to a speed distribution of said relative rotating movement over a range of the relative reciprocating movement, or both said first and second values, said reciprocation control device controlling said first electrically operated bidirectional actuator based on the determined values;

a changing mechanism, associated with said honing head, for changing one of a radial position of said honing stones in a radial direction of said cylindrical surface of the workpiece, and contact pressure between said honing stones and said cylindrical surface, said changing mechanism including a second electrically operated bidirectional actuator;

a resistance measuring device for measuring a honing resistance between said honing stones and said cylindrical surface of the workpiece; and a honing control device connected to said resistance measuring device and said second electrically operated bidirectional actuator governed by the measured honing resistance for determining a value corresponding to one of the radial position of said honing stones in said radial direction, and said contact pressure between said honing stones and said cylindrical surface of the workpiece, said honing control device controlling said second electrically operated bidirectional actuator based on the determined one of the corresponding values.

16. A honing apparatus according to claim 15, wherein said honing control device includes means for comparing the honing resistance measured by said resistance measuring device with a predetermined upper limit and a predetermined lower limit, means for determining a difference between said measured honing resistance and said upper or lower limit at times when the measured honing resistance is larger than said upper limit or smaller than said lower limit, said honing control device controlling said electrically operated bidirectional actuator of said changing mechanism such that a rate of change in the radial position of said honing stones is changed by an amount proportional to said determined difference.

* * * * *

UNITED STATES PATENT AND TRADEMARK OFFICE
CERTIFICATE OF CORRECTION

PATENT NO. : 4,945,685
DATED : August 7, 1990
INVENTOR(S) : YOSHIMI KAJITANI ET AL.

It is certified that error appears in the above-identified patent and that said Letters Patent is hereby corrected as shown below:

Claim 1, column 15, line 3, "betweens" should be --between--.

Claim 8, column 16, line 48, "a" (2nd occurrence) should be --an--.

Claim 12, column 17, line 66, "gu ides" should be --guides--.

Claim 13, column 18, lines 19-20, "surafce" should be --surface--.

Claim 13, column 18, line 20, "workpiece" should be followed by --,--.

Signed and Sealed this

Twenty-sixth Day of October, 1993

BRUCE LEHMAN

*Attest:*

*Attesting Officer*   Commissioner of Patents and Trademarks